(12) United States Patent
Rostan

(10) Patent No.: US 6,476,359 B2
(45) Date of Patent: Nov. 5, 2002

(54) CIGAR LIGHTER WITH THERMAL SAFETY DEVICE

(75) Inventor: Philippe Rostan, Bobigny Cedex (FR)

(73) Assignee: Valeo Vision, Cedex (FR)

( * ) Notice: Subject to any disclaimer, the term of this patent is extended or adjusted under 35 U.S.C. 154(b) by 0 days.

(21) Appl. No.: 09/886,451

(22) Filed: Jun. 21, 2001

(65) Prior Publication Data

US 2002/0020694 A1 Feb. 21, 2002

(30) Foreign Application Priority Data

Jun. 22, 2000 (FR) .............................. 00 08040

(51) Int. Cl.[7] ................................. B60N 3/14
(52) U.S. Cl. ..................... 219/265; 219/267
(58) Field of Search ............... 219/265, 267, 219/270

(56) References Cited

U.S. PATENT DOCUMENTS 5,233,162 A 8/1993 von Gaisberg et al.
5,493,098 A 2/1996 Diederich
5,932,126 A * 8/1999 Thivet .................... 219/265
6,130,409 A * 10/2000 Batut et al. ............. 219/265

FOREIGN PATENT DOCUMENTS

FR 2775451 9/1999

* cited by examiner

*Primary Examiner*—John A. Jeffery
(74) *Attorney, Agent, or Firm*—Morgan & Finnegan, LLP

(57) ABSTRACT

The present invention relates to a cigar lighter, especially for a motor vehicle, comprising a heating body and a knob intended to be engaged in the heating body, this knob including a heating resistance element located in a cup and able to be supplied with electricity via a supply bimetallic strip in contact with the cup when the knob is pushed in into a heating position, and a safety device maintaining electrical contact with the cup, whatever the shape of the supply bimetallic strip, in order to continue to supply the heating resistance element as long as the knob is pushed in into the heating body in heating position, in which the electrical contact between the safety device and the cup is formed on the flank of the outer face of the cup.

7 Claims, 3 Drawing Sheets

CIGAR LIGHTER WITH THERMAL SAFETY DEVICE

FIELD OF THE INVENTION

The invention relates to cigar and cigarette lighters, especially those for motor vehicles. More precisely, the invention relates to cigar lighters with a thermal safety device.

BACKGROUND OF THE INVENTION

Cigar lighters of this kind are already known, comprising a heating body and a knob 1 intended to be engaged in the heating body. This knob 1 includes a heating resistance element 3 placed in a cup 5 (see FIGS. 1 and 2). This heating resistance element can be supplied with electricity via a supply bimetallic strip in contact with the cup when the knob is pushed into the heating position in the heating body. When this cigar lighter is put into use, the knob is pushed in within the body until the cup is latched onto by the bimetallic strip. When the temperature of the heating resistance element is sufficient, the supply bimetallic strip deforms, cutting off the passage of current in the heating resistance element and allowing the releasing of the knob which comes back into gripping position.

However, if a person or an object continues to exert a force on the knob while it is being heated, or if jamming occurs in the knob, the latter can no longer come back into gripping position. A cyclic phenomenon is then set up: the supply bimetallic strip deforms and cuts off the electrical contact, the cigar lighter cools down progressively and the supply bimetallic strip then comes back to its initial position, re-activating the heating until the supply bimetallic strip again deforms so as to cut off the heating. This cycle occurs until external intervention unblocks the knob. Throughout this time, the electrical harness connected to the cigar lighter conducts the heat given off, by the heating cycle, within the heating body. This may entail damage to the insulation of the electrical cables, damage to the cigar lighter itself, as well as other accidents, such as a fire.

DISCUSSION OF THE INVENTION

This problem is resolved by virtue of a safety bimetallic strip, installed at the bottom of the heating body (in the hottest part of the heating body) and linked to the positive terminal of the electrical circuit of the cigar lighter. Thus, if the cigar lighter becomes abnormally hot, the safety bimetallic strip deforms and comes to touch a metal piece linked to the negative terminal of the electrical circuit of the cigar lighter, thus causing a short-circuit in the cigar lighter. The fuse of the vehicle to which the cigar lighter is linked immediately blows, thus cutting off the energy to the cigar lighter. The latter no longer heats up and any risk of fire or of damage is avoided. However, in order for the cigar lighter to become abnormally hot, it is necessary for the heating resistance element to operate continuously if the knob is pushed in, even when the supply bimetallic strip is in its deformed configuration corresponding to the opening of the electrical contact between this supply bimetallic strip and the knob.

This function is carried out by a safety device 7 (known to the person skilled in the art by the name of "safety buffer"), which maintains electrical contact with the knob 1, whatever the configuration of the supply bimetallic strip (FIGS. 1 and 2). The temperature then rises very quickly in the cigar lighter and the safety bimetallic strip deforms so as to cut off the heating, by blowing of the fuse of the vehicle, thus preserving the integrity of the electrical harness.

In the current state of the art, the terminals used for this safety device 7 are such that the electrical contact between this safety device 7 and the cup 5 is formed by the bottom of the cup 5, in proximity to or level with the edge of the aperture of the cup 5 by which the user has access to the heating resistance element (FIGS. 1 and 2).

However, the edge of the aperture of the cup through which the user has access to the heating resistance element corresponds to the hottest area of the cup. This area therefore has a tendency to oxidize. Furthermore, it is in this region that cigar or cigarette ash can be deposited. This causes a degradation of the electrical contact between the safety device and the cup, which is capable of entailing the formation of electric arcs. These poor contacts thus entail an additional heat contribution which is capable of being transmitted to the heating resistance element. This results in degradation thereof, in particular by the formation of electrical contacts between the turns of this heating resistance element. Very rapid degradation of the cigar lighter can then ensue.

An object of the invention is to extend the lifetime of cigar lighters equipped with such a safety device.

This object is achieved, according to the invention, by virtue of a cigar lighter, especially for a motor vehicle, comprising a heating body and a knob intended to be engaged in the heating body, this knob including:
- a heating resistance element, placed in a cup and able to be supplied with electricity via a supply bimetallic strip in contact with the cup when the knob is pushed in into heating position,
- as well as a safety device maintaining electrical contact with the cup, whatever the shape of the supply bimetallic strip, in order to continue to supply the heating resistance element as long as the knob is pushed in into the heating body in heating position,
- characterized by the fact that the electrical contact between the safety device and the cup is formed on the flank of the outer face of the cup.

In effect, by virtue of the invention, electrical contact between the safety device and the cup is made in a region of the cup which is further from the heating resistance element. Hence, even if the electrical contact between the safety device and the cup is not optimal, the additional heat contribution due to this poor contact is not directly and immediately transmitted to the heating resistance element. The latter is therefore protected from excessive additional heat originating especially from electric arcs. Its lifetime is therefore extended.

Advantageously, in the cigar lighter according to the invention, contact between the safety device and the cup is made in proximity to or in the region of that part of the cup having the widest diameter. In fact, this region corresponding to the widest diameter of the cup is spaced away from the region where contact is made between the heating resistance element and the cup. In this way, the heating resistance element is spaced even further away from the area of contact between the safety device and the cup.

Advantageously, the safety device is in the form of a strip, configured overall so as to have a U shape in longitudinal section. Electrical contact between the safety device and the cup is then made in the region of and in proximity to the longitudinal extremities of the strip, while the part of the strip corresponding to the bottom of the U is spaced away from the heating resistance element. This makes it possible to limit the transmission of the heat given off by the heating resistance element to the safety device. The fact that the safety device is thus not subjected to excessively high temperatures limits its corrosion.

Advantageously, the safety device is made of solid brass, so as to be less sensitive to corrosion.

Further advantageously, the safety device is in contact with a safety bimetallic strip, arranged in order to establish a short-circuit in the electrical circuit of the cigar lighter when it deforms under the effect of the excess heat produced in the course of a malfunction of the cigar lighter.

Other aspects, objects and advantages of the invention will be better understood with the aid of the detailed description which follows.

DESCRIPTION OF THE PREFERRED EMBODIMENTS OF THE INVENTION

One particular but not limiting embodiment of the cigar lighter 10 in accordance with the present invention is described in detail below in relation to FIGS. 3 and 4.

Figure 1:
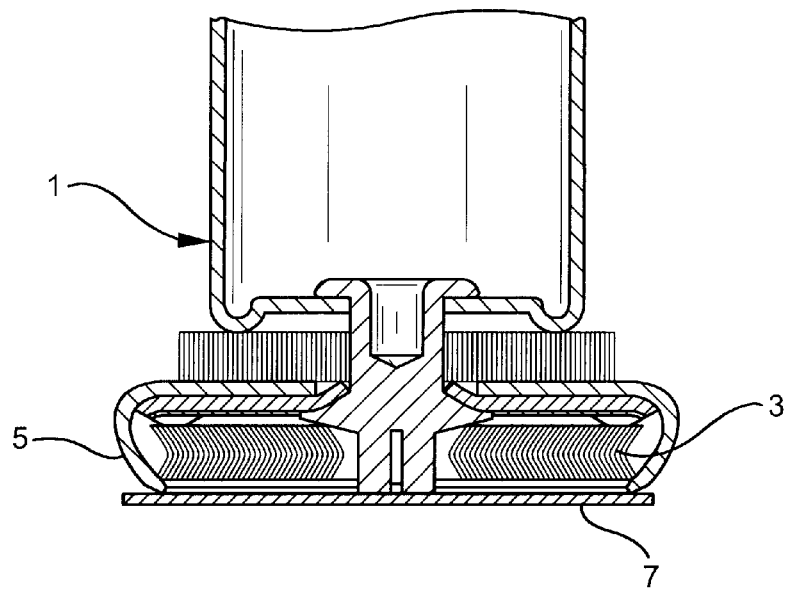
FIGS. 1 and 2 represent a cigar lighter knob, in diagrammatic section, passing through the longitudinal axis of this knob.
Figure 2:
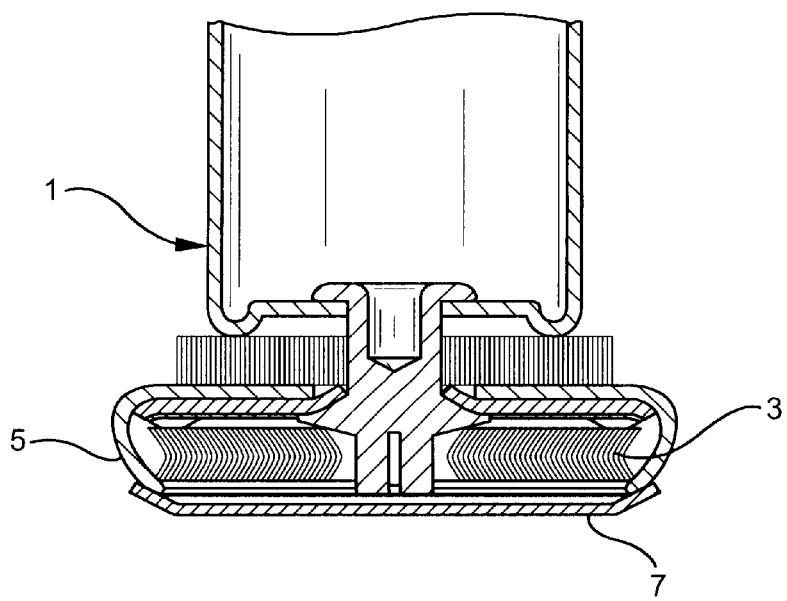
Figure 3:
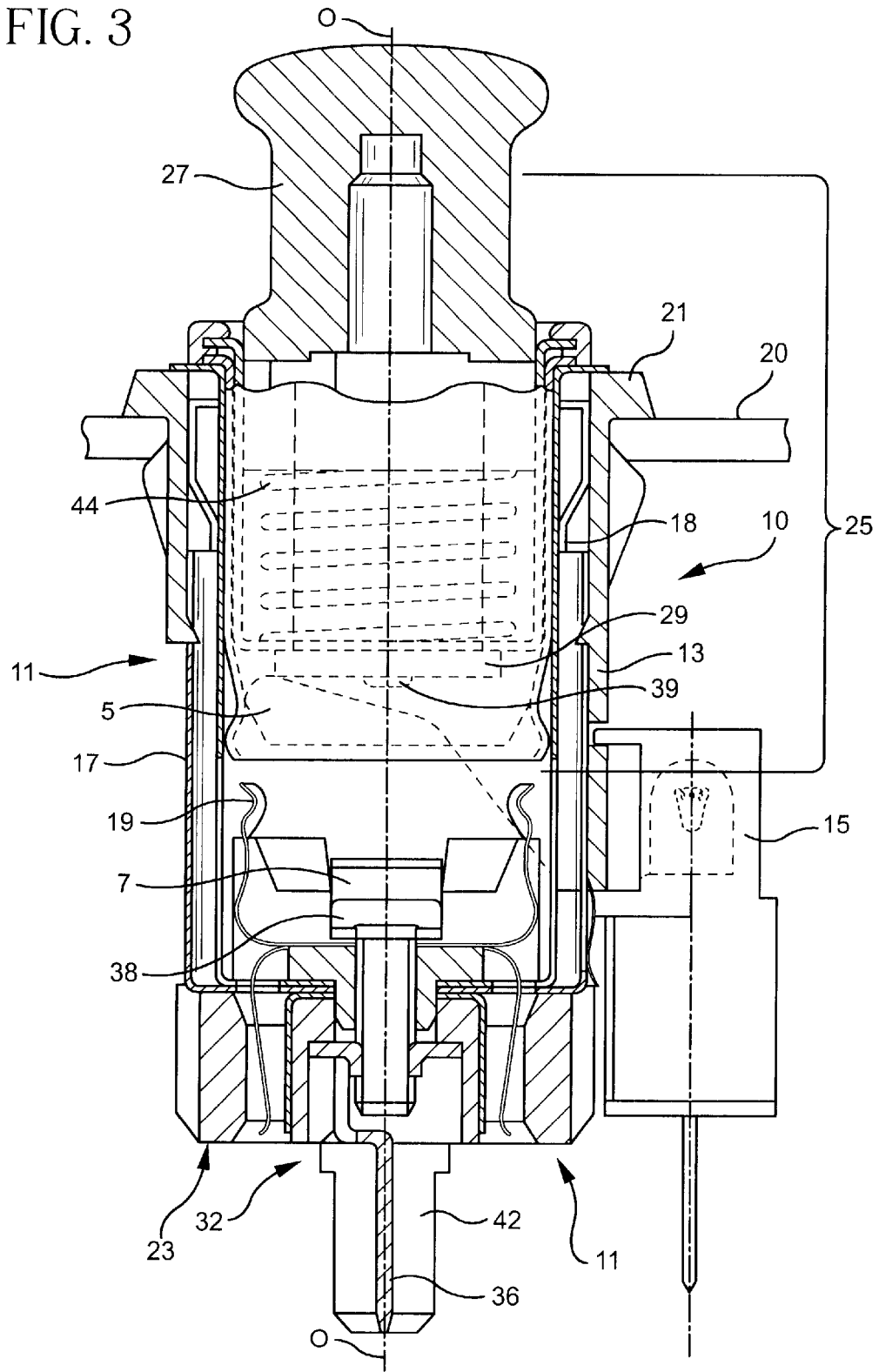
FIG. 3 represents a cigar lighter in accordance with the present invention, in diagrammatic section, passing through its longitudinal axis.

As represented in FIG. 3, what is involved is a cigar lighter 10, to be flush-mounted on a dashboard 20 of a motor vehicle. The cigar lighter 10 has an overall cylindrical geometry, about a longitudinal axis 0—0.

The knob 1 includes a fixed part 23 and a moveable part 25.

The moveable part 25 comprises a cup 5 including a heating resistance element 3 wound into a spiral, a push button 27 and electrically and thermally insulating elements 29, interposed between the cup 5 and the push button 27.

An embodiment of the moveable part 25 comprises two parts which are moveable axially with respect to each other, against the action of a helical return spring. One of these parts is in fact moveable, and comprises a finger grip button fixed to an insulating cap. The cap carries a support for a heater element which is mounted within an end cup element. The support is in the form of a sleeve with a base which carries, fixed to it by means of a rivet, the cup element and the heater element, with an insulating ring being interposed between the base and the cup element.

The fixed part of the heater plug comprises a ring on which is fastened a fire shield, which surrounds a guide joined by molding to the ring. The fire shield surrounds the heater element, while the guide serves for guiding the heater element support, the return spring being interposed between the base and the insulating cap. The finger grip button, the cap and the ring are made of electrically insulating material, which is plastics material in this example. The button and the said cap are also of thermally insulating material. The other components of the moveable part, apart from the insulating ring, are made of electrically conductive material, i.e. metal.

The heater element consists, for example, of a spiral-wound heating resistance contained within the end cup element. The fire shield has a circumferential groove which is generally V-shaped and which acts as a receptacle for two axial retaining tongues diametrically opposed to each other and forming part of the lighter body. In this example, the tongues are part of the electrically conductive lighter sleeve element, which is press-formed from sheet metal. The tongues are formed in U-shaped slots of the sleeve element. The sleeve element has, at its open free end, a collar portion which is arranged to engage on the front face of the ring portion which forms part of the locking means of the illuminating sleeve.

The fixed part 23 includes a heating body 11, a connection module 32, a safety device 7, a supply bimetallic strip 19, a safety bimetallic strip 34, an illuminating ring 13 and a lighting module 15 (FIG. 3).

The heating body 11 includes a socket 17 and a cylindrical guide 18 serving as a receptacle for the knob 1, and is fitted internally with a supply bimetallic strip 19 for supplying electricity to a heating resistance element 3 wound into a spiral in the knob 1.

The illuminating ring 13 surrounds the heating body 11, allows the latter to be fixed onto the dashboard 20 and makes it possible to illuminate a collar 21 for identifying the cigar lighter 10 by night.

The lighting module 15 is mounted so as to protrude on the illuminating ring 13. A description of an embodiment of the heating body 11, illuminating ring 13 and lighting module 15 as mentioned above will be found in the document FR 2 558 111.

The cylindrical guide 18 is coaxial with the socket 17 and inside it. The connection module 32 is arranged at the end of the heating body 11, opposite that where the knob 1 is inserted. The positive-polarity pin 36 of the connection module 32 is linked to a central screw 38, itself electrically connected to the safety device 7, itself in electrical contact with the supply bimetallic strip 19. The supply bimetallic strip 19 serves to establish electrical contact with the cup 5 when the knob 1 is pushed in into heating position, and supplies the heating resistance element 3 which is itself, via its periphery, in contact with the cup 5.

The negative-polarity pin 42 of the connection module 32 is linked to the socket 11 and to the cylindrical guide 30.

The power-supply loop for the cigar lighter is closed by the push button 27 via a central rivet 39 which is connected to the center of the heating resistance element 3.

The bottom of the cylindrical guide thus constitutes a region of negative polarity 40 (that is to say ground).

Advantageously, the contact between the heating resistance element 3 and the cup 5 is made in proximity to or level with the edge of the aperture of the cup 5 through which the user has access to the heating resistance element 3.

Figure 4:
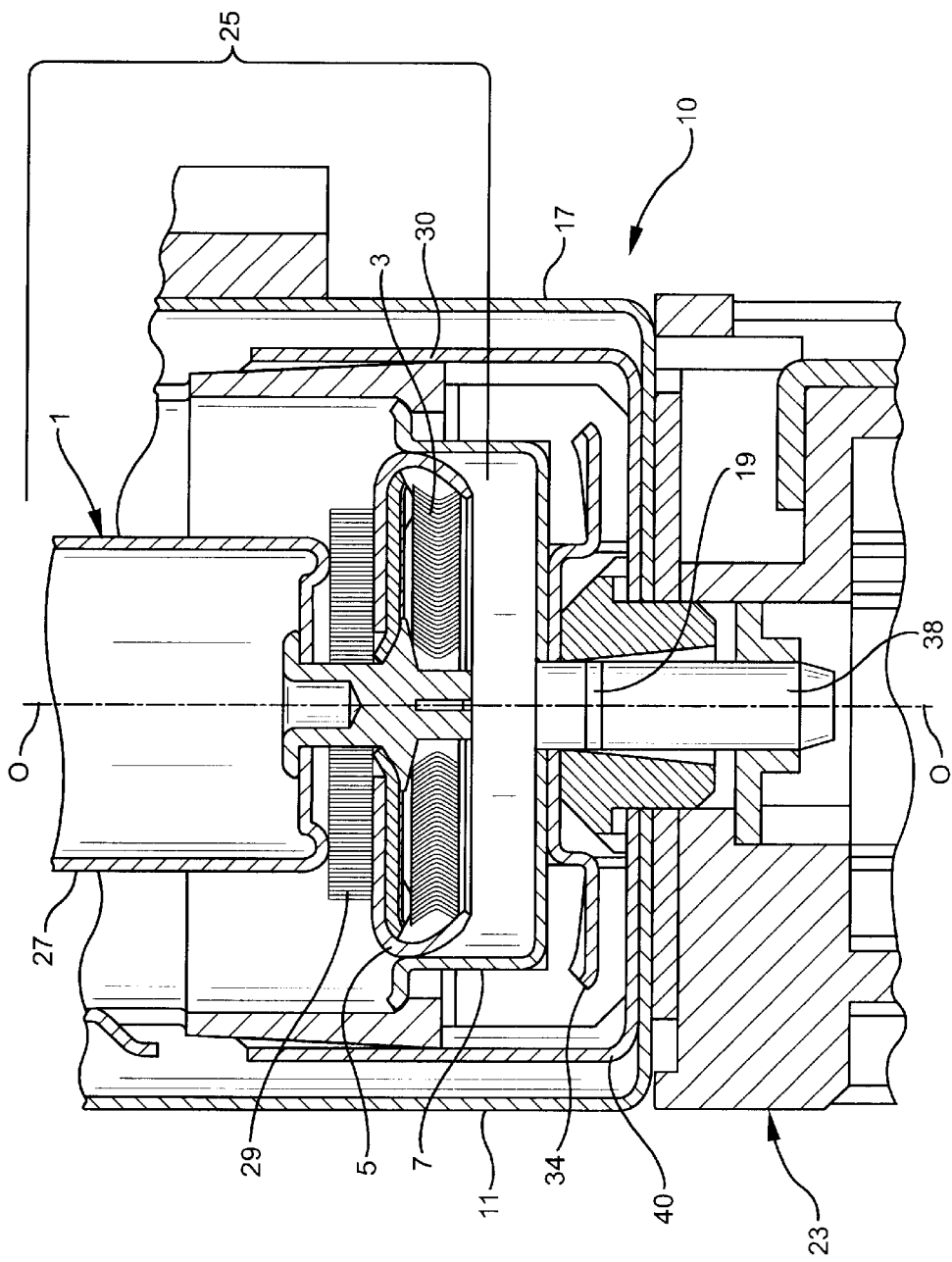
FIG. 4 represents a detail of the cigar lighter represented in FIG. 3, in diagrammatic section, passing through its longitudinal axis, the sectional plane of FIG. 4 being turned by 90° with respect to the sectional plane of FIG. 3, about the longitudinal axis.

As represented, in FIG. 4, the safety device 7 is in the form of a rectangular strip made of solid brass, folded perpendicularly to its longitudinal axis so as to form a U in longitudinal section parallel to the axis 0—0. This shaping is adapted so that the safety device 7 does not bear on the underside of the cup 5, that is to say the edge of the cup 5 bordering the aperture through which the user has access to the heating resistance element 3, but on its flank. In this way, the safety device 7 bears on the least hot regions of the cup 5. This geometry also makes it possible to have a security-device 7/cup 5 contact as far as possible from the heating resistance element 3 so as to reduce the transmission of the heat diffusing, by radiation, from the heating resistance element 3 towards the safety device 7.

The longitudinal axis of the safety device 7 extends radially perpendicularly to the longitudinal axis 0—0 and to the supply bimetallic strip 19.

The safety bimetallic strip 34 is in the form of a rectangular strip which also extends radially perpendicularly to the longitudinal axis 0—0 and to the supply bimetallic strip 19.

In normal operation, the knob 1 is pushed in inside the heating body 11 until latching occurs between the supply bimetallic strip 19 and the cup 5; the heating resistance element 3, then supplied with electricity, heats up. When the temperature is sufficient, the supply bimetallic strip 19 deforms and the power supply to the heating resistance element 3 is cut off. The deformation of the supply bimetallic strip 19 allows the release of the knob 1 which comes back into gripping position, by virtue of the spring 44 (see FIG. 3). A normal heating cycle generally lasts 10 to 20 seconds. If the knob 1 remains pushed in, the safety device 7 maintains contact with the cup 5 despite the deformation of the supply bimetallic strip 11. The heating resistance element therefore continues to heat up. At a temperature which is predetermined so that the cigar lighter and its electrical power-supply harness do not become damaged, the safety bimetallic strip 34 deforms and short-circuits the power supply to the cigar lighter by coming into contact with the negative-polarity area 40. In less than one minute, and preferably in less than 50 seconds, the fuse of the electrical circuit of the cigar lighter blows, thus preserving the integrity of the electrical harness.

What is claimed is:

1. A cigar or cigarette lighter, for a motor vehicle, comprising a heating body and a knob intended to be engaged in the heating body, the knob including a heating resistance element located in a cup and able to be supplied with electricity via a supply bimetallic strip in contact with the cup when the knob is pushed in into heating position, and a safety device maintaining electrical contact with the cup, whatever the shape of the supply bimetallic strip, in order to continue to supply the heating resistance element as long as the knob is pushed in into the heating body in heating position, wherein the electrical contact between the safety device and the cup is formed on the flank of the outer face of the cup.

2. A lighter as claimed in claim 1, wherein contact between the safety device and the cup is made in proximity to or level with that part of the cup having the widest diameter.

3. A lighter as claimed in claim 1, wherein contact between the heating resistance element and the cup is made in proximity to or level with the edge of the aperture of the cup by which the user has access to the heating resistance element.

4. A lighter as claimed in claim 1, wherein the safety device is in the form of a strip, configured overall so as to have a U shape in longitudinal section, electrical contact between the safety device and the cup being made in the region of or in proximity to the longitudinal extremities of the strip.

5. A lighter as claimed in claim 4, wherein the part of the strip corresponding to the bottom of the U is spaced away from the heating resistance element, so as to limit the transmission of the heat given off by the heating resistance element to the safety device in particular.

6. A lighter as claimed in claim 1, wherein the safety device is in contact with a safety bimetallic strip, arranged in order to establish a short-circuit in the electrical circuit of the cigar lighter when it deforms under the effect of the excess heat produced in the course of a malfunction of the lighter.

7. A lighter as claimed in claim 1, wherein the safety device is made of solid brass.

* * * * *